(12) United States Patent
Gugel

(10) Patent No.: US 7,466,885 B2
(45) Date of Patent: Dec. 16, 2008

(54) LIGHT SOURCE COMPRISING A PLURALITY OF MICROSTRUCTURED OPTICAL ELEMENTS

(75) Inventor: Hilmar Gugel, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 43 days.

(21) Appl. No.: 10/570,486

(22) PCT Filed: Sep. 6, 2004

(86) PCT No.: PCT/EP2004/052053

§ 371 (c)(1),
(2), (4) Date: Mar. 3, 2006

(87) PCT Pub. No.: WO2005/024482

PCT Pub. Date: Mar. 17, 2005

(65) Prior Publication Data

US 2007/0025662 A1    Feb. 1, 2007

(30) Foreign Application Priority Data

Sep. 5, 2003    (DE) ................ 103 40 964

(51) Int. Cl.
G02B 6/12    (2006.01)
G02B 6/26    (2006.01)
G02B 6/02    (2006.01)

(52) U.S. Cl. ............................ 385/50; 385/123; 385/14

(58) Field of Classification Search ................ 385/50, 385/123, 14

See application file for complete search history.

(56) References Cited

U.S. PATENT DOCUMENTS

| 5,731,588 | A | 3/1998 | Hell et al. |
| 5,960,146 | A | 9/1999 | Okuno et al. |
| 6,097,870 | A * | 8/2000 | Ranka et al. ............ 385/127 |
| 6,545,791 | B1 * | 4/2003 | McCaughan et al. ........ 359/245 |
| 6,611,643 | B2 * | 8/2003 | Birk et al. ................ 385/33 |
| 6,654,166 | B2 * | 11/2003 | Birk et al. ............... 359/389 |
| 6,710,918 | B2 * | 3/2004 | Birk et al. ............... 359/385 |
| 6,796,699 | B2 * | 9/2004 | Birk et al. ............... 362/556 |
| 6,813,073 | B2 | 11/2004 | Engelhardt et al. |
| 6,888,674 | B1 * | 5/2005 | Birk et al. ............... 359/385 |

(Continued)

FOREIGN PATENT DOCUMENTS

DE    44 16 558 A1    8/1995

(Continued)

OTHER PUBLICATIONS

Birks, T.A. et al., "Supercontinuum Generation in Tapered Fibers," Optics Letters, Optical Society of America, vol. 25, No. 19, Oct. 1, 2000, pp. 1415-1417.

(Continued)

*Primary Examiner*—K. Cyrus Kianni
(74) *Attorney, Agent, or Firm*—Foley & Lardner LLP

(57) ABSTRACT

The invention relates to a light source comprising a microstructured optical element (11) that receives and spectrally spreads the light from a primary light source (3). The inventive light source is characterized in that the spectrally spread light penetrates at least one other microstructured optical element (15, 19, 21). Said light source can be efficiently used in scanning microscopy and especially in STED microscopy.

20 Claims, 3 Drawing Sheets

U.S. PATENT DOCUMENTS

| | | | |
|---|---|---|---|
| 6,898,367 B2 * | 5/2005 | Birk et al. | 385/147 |
| 6,993,228 B2 * | 1/2006 | Burke et al. | 385/123 |
| 7,110,645 B2 * | 9/2006 | Birk et al. | 385/117 |
| 7,123,408 B2 * | 10/2006 | Birk et al. | 359/385 |
| 2002/0006264 A1 * | 1/2002 | Birk et al. | 385/147 |
| 2002/0009260 A1 * | 1/2002 | Birk et al. | 385/33 |
| 2002/0018293 A1 * | 2/2002 | Birk et al. | 359/385 |
| 2002/0028044 A1 * | 3/2002 | Birk et al. | 385/43 |
| 2002/0043622 A1 * | 4/2002 | Birk et al. | 250/306 |
| 2002/0050564 A1 * | 5/2002 | Birk et al. | 250/306 |
| 2003/0081915 A1 | 5/2003 | Fajardo et al. | |
| 2004/0254474 A1 * | 12/2004 | Seibel et al. | 600/473 |
| 2005/0069269 A1 * | 3/2005 | Libori et al. | 385/125 |
| 2005/0111816 A1 * | 5/2005 | Birk et al. | 385/147 |
| 2005/0122580 A1 * | 6/2005 | Birk et al. | 359/389 |
| 2005/0249457 A1 * | 11/2005 | Seyfried et al. | 385/18 |
| 2007/0035822 A1 * | 2/2007 | Birk et al. | 359/385 |

FOREIGN PATENT DOCUMENTS

| | | |
|---|---|---|
| DE | 101 15 488 A1 | 12/2001 |
| DE | 101 15 509 A1 | 12/2001 |
| DE | 100 56 382 A1 | 5/2002 |
| EP | 0 491 289 B1 | 4/1996 |
| EP | 0 886 174 A2 | 12/1998 |
| EP | 0 495 930 B1 | 4/1999 |
| EP | 0 922 992 A2 | 6/1999 |
| EP | 1 184 701 A1 | 3/2002 |
| JP | 2002-148468 A | 5/2002 |

OTHER PUBLICATIONS

Ranka, J.K. et al., "Visible Continuum Gereration in Air-Silica Microstructure Optical Fibers with Anomalous Dispersion at 800 nm," Optics Letters, Optical Society of America, vol. 25, No. 1, Jan. 1, 2000, pp. 25-27.

S. Hell, "Increasing the Resolution of Far-Field Fluorescence Light Microscopy by Point-Spread-Function Engineering," Topics in Fluorescence Spectroscopy, vol. 5; Nonlinear and Two-Photon-Induced Fluorescence, 1997, pp. 361-426.

T. A. Klar et al., "Fluorescence microscopy with diffraction resolution barrier broken by stimulated emission," Proc. Natl. Acad. Sci., vol. 97, No. 15, Jul. 18, 2000, pp. 8206-8210.

V. Westphal et al., "Laser-diode-stimulated emission depletion microscopy," Applied Physics Letters, vol. 82, No. 18, May 5, 2003, pp. 3125-3127.

* cited by examiner

LIGHT SOURCE COMPRISING A PLURALITY OF MICROSTRUCTURED OPTICAL ELEMENTS

The invention relates to a light source comprising a microstructured optical element that receives and spectrally spreads the light from a primary light source.

Patent specification U.S. Pat. No. 6,097,870 discloses an arrangement for generating a broadband spectrum in the visible and infrared spectral regions. The arrangement is based on a microstructured fiber into which the light from a pump laser is coupled. The pump light is spread in the microstructured fiber by nonlinear effects. Use is made as microstructured fiber of so-called photonic band gap material or photon crystal fibers, holey fibers or microstructured fibers. Configurations as so-called hollow fibers are also known.

A further arrangement for generating a broadband spectrum is disclosed in the publication by Birks et al.: "Supercontinuum generation in tapered fibers" Opt.Lett. Vol. 25, p. 1415 (2000). Use is made in the arrangement of a conventional optical fiber with a fiber core that has a taper at least along a segment. Optical fibers of this type are known as so-called tapered fibers.

Particularly in microscopy, endoscopy, flow cytometry, chromatography and in lithography, universal illuminating devices of high luminance are important for illuminating the objects. In scanning microscopy, a sample is scanned with a light beam. Lasers are frequently used as light source for this purpose. An arrangement with a single laser emitting a plurality of laser lines, for example, is known from EP 0 495 930: "Konfokales Mikroskopsystem für Mehrfarbenfluoreszenz" ["Confocal microscope system for polychromatic fluorescence"]. At present, it is mostly mixed gas lasers, in particular ArKr lasers, that are used. Biological tissues or sections prepared with the aid of fluorescent dyes, for example, are examined as a sample. In the field of material examination, the illuminating light reflected by the sample is often detected. Use is also frequently made of solid state lasers and dye lasers as well as of fiber lasers and optical parametric oscillators (OPOs) upstream of which a pump laser is arranged.

Laid-open patent application DE 101 15 488 A1 discloses an apparatus for illuminating an object that includes a microstructured optical element that spectrally spreads the light of a laser. The apparatus comprises an optics that shapes the spectrally spread light to form an illuminating light beam. The laid-open patent application also discloses the use of the apparatus for illumination in a microscope, in particular in a scanning microscope.

Patent application DE 101 15 509 A1 discloses an arrangement for examining microscopic preparations with the aid of a scanning microscope and of an illuminating device for a scanning microscope. The arrangement comprises a laser and an optical means that projects the light generated by the laser onto a sample to be examined. Provided between the laser and the optical means is an optical component that spectrally spreads in the light generated by the laser during a single pass, the optical component consisting of photonic band gap material and preferably being designed as an optical fiber.

The generation of light of a broadband wavelength spectrum from 500 to 1600 nm with the aid of an air/quartz-glass fiber is exhibited in the article by Ranka et al., Optics Letters, Vol. 25, No. 1.

Apart from depending on the wavelength of the primary light source, the properties of the light generated with the aid of microstructured optical elements, such as photonic crystal fibers, for example, also depend on the parameters of the microstructured optical element such as for example, the zero-dispersion wavelength or the type and the dimensions of the hole structure or microstructure. As a rule, given the same wavelength of the primary light two different photonic crystal fibers have a different emission spectrum. This is particularly disadvantageous, in particular, with regard to the reproducibility of experiments.

As a rule, the power of the spectrally spread light is distributed in a largely uniform fashion over the entire broad spectral region such that only a relatively slight light power (typically 1-5 mW/nm) is available for applications in which only light of individual wavelengths or light of an individual small wavelength region is required.

Laid-open patent application DE 100 56 382 A1 discloses a light source for illuminating in scanning microscopy and a scanning microscope. The light source contains an electromagnetic energy source that emits light of one wavelength, and a means for spatially dividing the light into at least two partial light beams. An intermediate element for changing wavelength is provided in at least one partial light beam. The light source can be used in STED microscopy.

In scanning microscopy, a sample is illuminated with a light beam in order to observe the reflected light or fluorescent light emitted by the sample. The focus of an illuminating light beam is moved in an object plane with the aid of a controllable beam deflecting device, generally by tilting two mirrors, the deflection axes mostly being perpendicular to one another such that one mirror deflects in the x-direction and, and the other in the y-direction. The tilting of the mirrors is accomplished, for example, with the aid of galvanometer actuating elements. The power of the light coming from the object via a detection beam path is measured with the aid of a detector as a function of the position of the scanning beam. The actuating elements are usually equipped with sensors for determining the current mirror position.

An object is scanned in three dimensions with the focus of a light beam specifically in confocal scanning microscopy.

A confocal scanning microscope generally comprises a light source, an imaging optics with the aid of which the light from the source is focused onto a pinhole diaphragm—the so-called excitation diaphragm—a beam splitter, a beam deflecting device for beam control, a microscope optics, a detection stop and the detectors for detecting the detection light or fluorescent light. The illuminating light is often coupled in via the beam splitter, which can, for example, be designed as a neutral beam splitter or as a dichroic beam splitter. Neutral beam splitters have the disadvantage that a great deal of excitation light or a great deal of detection light is lost depending on the splitting ratio.

The detection light (for example fluorescent light or reflection light) coming from the object passes back via the beam deflecting device to the beam splitter, passes the latter and is subsequently focused onto the detection stop behind which the detectors are located. Detection light that does not originate directly from the focus region takes a different light path and does not pass the detection stop, and so punctiform information is obtained that leads by means of sequential scanning of the object to a three-dimensional image. A three-dimensional image is mostly obtained by layerwise image data acquisition, the track of the scanning light beam ideally describing a meandering line on and/or in the object (scanning a line in the x-direction for a constant y-position, subsequently stopping x-scanning and pivoting by y-adjustment to the next line to be scanned and then, for a constant y-position, scanning this line in a negative x-position, etc). In order to enable layerwise image data acquisition, the sample stage or the objective is displaced after the scanning of a layer, and in this way the next layer to be scanned is brought into the focal plane of the objective.

In many applications, samples are prepared with a plurality of markers, for example a plurality of different fluorescent dyes. These dyes can be excited sequentially, for example with the aid of illuminating light beams that have different excitation wavelengths.

As is described in European patent EP 0 491 289 entitled "Doppelkonfokales Rastermikroskop" ["Double confocal scanning microscope"], it is possible to achieve an increase in resolution in the direction of the optical axis by means of a double objective arrangement (4Pi arrangement). The light coming from the illuminating system is split into two partial beams that illuminate the sample simultaneously in a fashion running opposite to one another through two objectives arranged with mirror symmetry. The two objectives are arranged on different sides of the object plane common to them. This interferometric illumination forms an interference pattern at the object point that exhibits a primary maximum and a plurality of secondary maxima in conjunction with constructive interference. By comparison with the conventional scanning microscope, owing to the interferometric illumination an increased axial resolution can be achieved with the aid of a double confocal scanning microscope.

An arrangement for raising the resolving power for fluorescence applications is known from DE 44 16 558. Here, the lateral edge regions of the focus volume of the exciting light beam are illuminated with the aid of a light beam of another wavelength, the so-called stimulation light beam, which is emitted by a second laser in order to bring the sample regions excited by the light from the first laser back into the ground state in a stimulated fashion. It is now only the spontaneously emitted light from the regions not illuminated by the second laser that is detected, and so an overall improvement in resolution is achieved. The designation of STED (Stimulated Emission Depletion) has been adopted for this method.

A new development has shown that it is possible to achieve an improvement in resolution simultaneously both laterally and axially when success is achieved in hollowing out the focus of the stimulation light beam. To this end, there is introduced into the beam path of the stimulation light beam a round phase delay plate that delays the light waves in subregions by a phase that corresponds to an optical path length of $\lambda/2$. The phase delay plate has a diameter smaller than the beam diameter and is therefore overilluminated. In order to achieve a stimulation beam hollow in the inside, the light quantity that experiences a phase delay of $\lambda/2$ must be equal to the light quantity not delayed.

STED microscopy is currently being carried out in three different configurations:

By means of a titanium-sapphire (TiSa) laser for stimulated deenergization of the fluorescent dye, and of an optical parametric oscillator (OPO), pumped by the TiSa, for exciting the fluorescent dye (Proc. Natl. Acad. Sci. U.S.A., Vol. 97, p. 8206-8210, 2000).

By means of two synchronized laser diodes of which one laser diode has a wavelength in the wavelength region of the absorption spectrum of the dye, and the other laser diode has a wavelength in the region of the emission spectrum of the dye (Appl. Phys. Lett., Vol. 82, No. 18, p. 3125-3127, 2003).

By means of a pulsed solid state laser whose light is used, on the one hand, for stimulated deenergization of the fluorescent dye. On the other hand, the light is doubled in frequency and used to excite the dye. (Hell, S. W. (1997). "Increasing the Resolution of Far-Field Fluorescence Microscopy by Point-Spread-Function Engineering." Topics In Fluorescence Spectroscopy 5: Nonlinear and Two-Photon-Induced Fluorescence. J. Lakowicz. New York, Plenum Press. 5.)

Titanium-sapphire lasers, for example, are used as light source in STED microscopy in conjunction with the optical parametric oscillators (OPOs). Light sources of this type have the disadvantage that they can make available only light of a very limited wavelength spectrum and that, moreover, they are difficult to operate. The very high procurement price is not the least of the disadvantages with these light sources. Mutually synchronized semiconductor lasers are also currently being used as light sources in STED microscopy, the light power of the laser diode used for stimulated deenergization often disadvantageously not sufficing. Moreover, operation is necessarily restricted to two wavelengths of the laser diodes used. As an alternative, solid state lasers with subsequent frequency doubling are also currently being used in STED microscopy. Two mutually independent wavelengths are hereby necessarily fixed for the light for exciting the sample, and for the light that effects a stimulated emission, and this limits the ability to use this type of light source to a few possible applications.

It is the object of the present invention to specify a light source comprising a microstructured optical element whose emission spectrum is adapted to the respective application, and that can be used, in particular, in scanning microscopy and, specifically, in STED microscopy.

The object is achieved by means of a light source characterized in that the spectrally spread light traverses at least one further microstructured optical element.

Owing to the sequential arrangement of two or more microstructured optical elements, the spectral properties of the light emitted by the light source can be influenced and adapted to the requirements of the intended application. In particular, the power of the light emitted by the light source can be increased in the spectral subregions that are of particular importance for the application by a suitable selection of the parameters of the microstructured optical element and of the further microstructured optical element. For example, when the light source is used in STED microscopy it is possible to maximize the light power in the region of the absorption spectrum of the sample dyes used and in the region of the emission spectrum of the sample dyes used. The inventive light source is therefore particularly suitable for applications in high-resolution microscopy such as, for example, the abovementioned STED microscopy or in STED-4Pi scanning microscopy (double confocal scanning microscope), and in CARS microscopy.

The inventive light source can advantageously be used to generate emission light whose spectral width exceeds the spectral width that each individual microstructured optical element would generate. Such a light source is of interest, in particular, for multiwavelength STED applications, since a very wide supercontinuum is required here.

In a very particularly preferred variant refinement of the light source, the microstructured optical element and the further microstructured optical element are spliced together. The splicing of optical fibers is a technique adequately known to the person skilled in the art. In laid-open patent application US 2003/0081915 it is described, in addition, how a conventional fiber and a microstructured fiber can be spliced together such that the transmission losses are minimized.

In another preferred variant refinement of the light source, the light that emerges from the microstructured optical element is coupled into the further microstructured optical element by a lens arrangement.

Pump-probe experiments can also be carried out efficiently with the aid of the inventive light source.

The primary light source is preferably a pulsed light source, and comprises in a preferred variant a pulsed laser that can be designed, for example, as a pulsed titanium sapphire laser.

In a particularly preferred embodiment, a means is provided for selecting light components over at least one wavelength and/or at least one wavelength region. These means can be, for example, color filters or dichroic filters. The means for selection preferably include an acousto-optical or electro-optical component. In a preferred variant, the means for selection is designed as an AOTF (Acousto Optical Tunable Filter) or as an AOBS (Acousto Optical Beam Splitter).

As already mentioned, the light source is also eminently suitable within a method for generating illuminating light for STED microscopy or for pump-probe experiments. A light component that has a wavelength within the excitation spectrum of the respectively used fluorescence dye is hereby split off from the spectrally spread light, emitted by the light source, with the aid of the means for selecting a light component and a further light component, which has a wavelength within the emission spectrum of the fluorescence dye used, is split up and formed into an illuminating light beam. Whereas the light component that has a wavelength within the excitation spectrum of the fluorescence dye serves to excite the sample in the illuminated region, the light component that has a wavelength within the emission spectrum serves for triggering stimulated emission in a sample region partially overlapping the excitation sample region. When the primary light source is a pulsed light source, the pulses in the two split off light components are necessarily mutually synchronized, which is a very important property for STED microscopy.

The light from the primary light source preferably traverses the microstructured optical element and/or the further microstructured optical element only once. However, a repeated traversal is also possible.

The microstructured optical element and/or the further microstructured optical element preferably contains photonic band gap material. The microstructured optical element and/or the further microstructured optical element are/is preferably designed as optical fiber(s) (photonic crystal fiber (PCS); holey fiber, etc).

In another variant, the microstructured optical element configured as an optical fiber has a taper (tapered fiber).

In a preferred embodiment of the scanning microscope, the microstructured optical element and/or the further microstructured optical element is assembled from a multiplicity of micro-optical structural elements that have at least two different optical densities. A very particular preference is for a refinement in which the optical element includes a first region and a second region, the first region having a homogeneous structure, and a microscopic structure composed of micro-optical structural elements is formed in the second region. It is also advantageous when the second region surrounds the first region. The micro-optical structural elements are preferably cannulars, webs, honeycombs, tubes or cavities.

In a particular variant, the microstructured optical element and/or the further microstructured optical element comprise/comprises glass or plastic material arranged next to one another and cavities. A particular preference is the variant design in which the microstructured optical element and/or the further microstructured optical element comprise/comprises photonic band gap material and is configured as an optical fiber. It is preferred to provide between the laser and the optical fiber an optical diode that suppresses backreflections of the light beam that originates from the ends of the optical fiber.

A design variant that is of very particular preference and easy to implement includes as microstructured optical element and/or as further microstructured optical element a conventional optical fiber with a fiber core diameter of approximately 9 μm that has a taper at least along a segment. Optical fibers of this type are known as so-called tapered fibers. The optical fiber is preferably 1 m long overall and has a taper of a length of 30 mm to 90 mm. In a preferred refinement, the diameter of the entire fiber is approximately 2 μm in the region of the taper.

A further preferred variant embodiment includes a microstructured optical element and a further microstructured optical element in the case of which elements the structural elements merge into one another continuously. In a very particularly preferred variant, a microstructured optical element and a further microstructured optical element are designed as optical fibers with a continuous transition.

The inventive light source can also, for example, be used in a flow cytometer or an endoscope or a chromatograph or a lithography apparatus.

The subject matter of the invention is illustrated schematically in the drawing and described below with the aid of the figures, in which.

Figure 1:
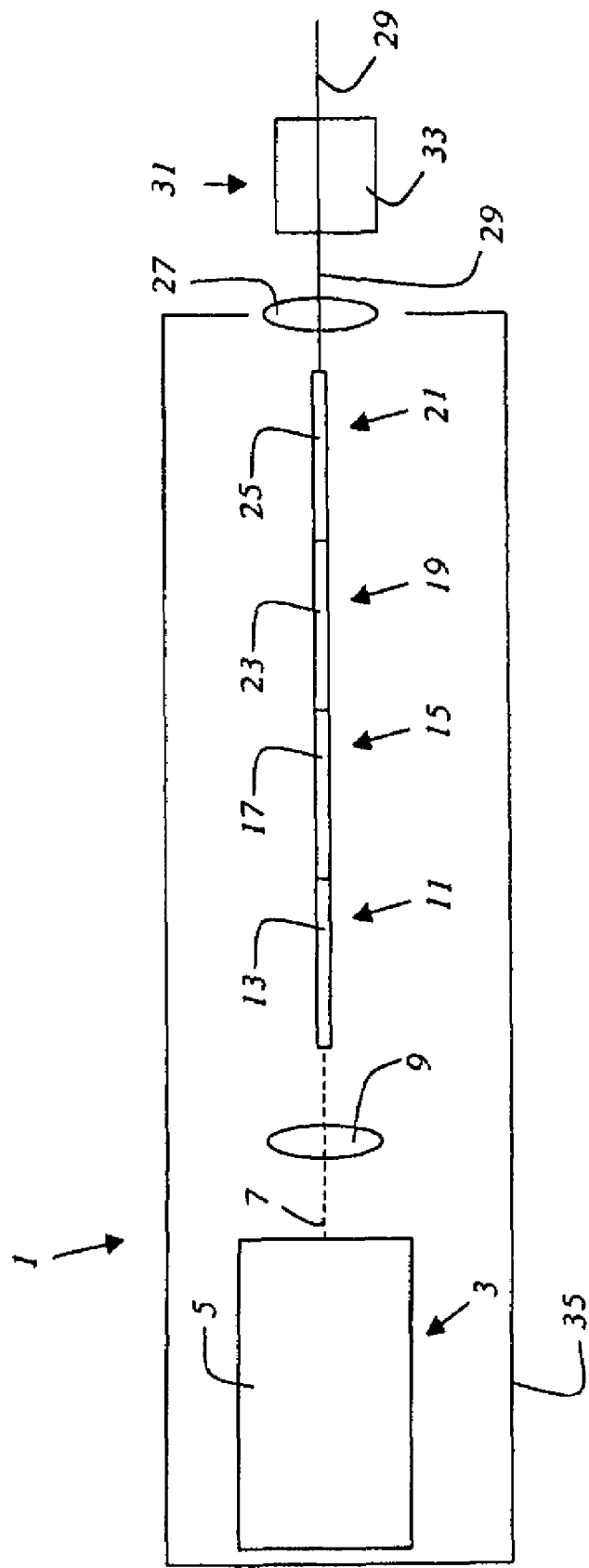
FIG. 1 shows an inventive light source.

FIG. 1 shows an inventive light source 1 having a primary light source 3 that is configured as a pulsed titanium sapphire laser 5. The light 7 from the primary light source is coupled with the aid of the incoupling optics 9 into a microstructured optical element 11 that is designed as a photonic crystal fiber 13. Spliced directly to the photonic crystal fiber 13 is a further microstructured optical element 15 that is designed as a further photonic crystal fiber 17. Following similarly a third and a fourth microstructured optical element 19, 21 are spliced to the third and fourth photonic crystal fibers 23, 25. The spectrally spread light emerging from the fourth photonic crystal fiber 25 is shaped into an illuminating light beam 29 with the aid of the optics 27. The illuminating light beam 29 subsequently traverses a means 31 for selecting light components of at least one wavelength and/or at least one wavelength region, which is designed as an AOTF 33. The illuminating light beam 29 emerging from the AOTF 33 now includes only light components of the selected wavelength or of the selected wavelength regions, while the remaining light components are directed by the AOTF into a beam trap (not shown). The light source has a housing 35 for the purpose of protection against external influences, in particular protection against contamination.

Figure 2:
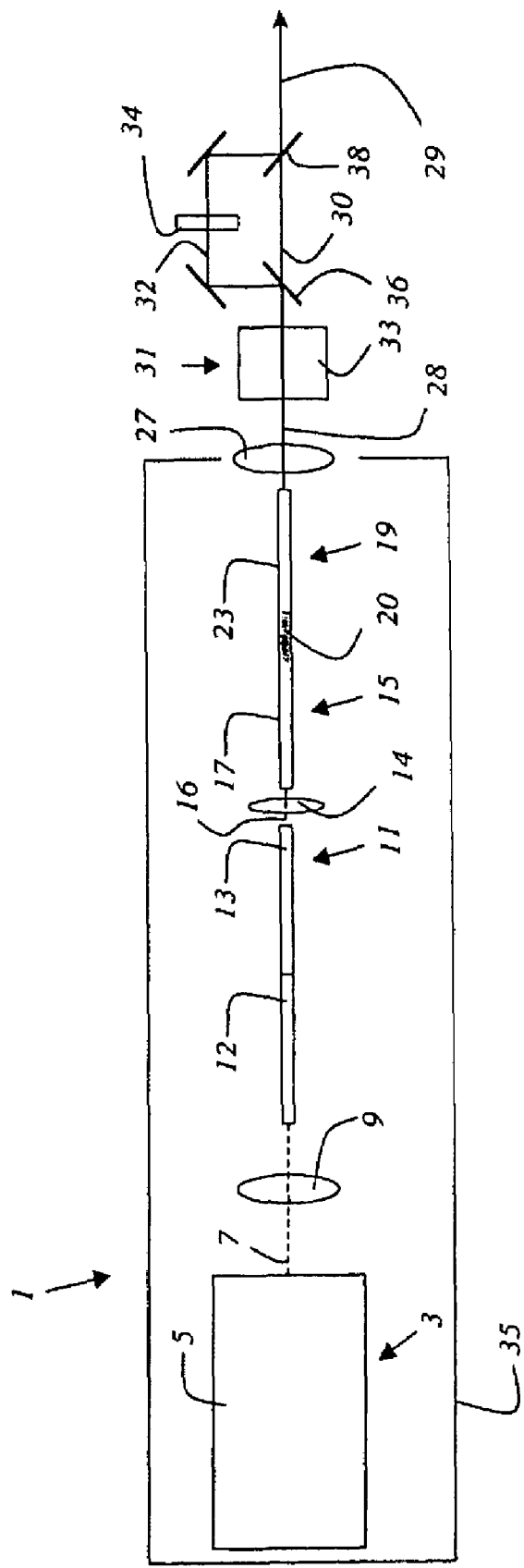
FIG. 2 shows a further inventive light source.

A further inventive light source is illustrated in FIG. 2. The light 7 from the primary light source 3 is firstly coupled into a conventional optical fiber 12 with the aid of the incoupling optics 9. The conventional optical fiber 12 is spliced to a microstructured optical element 11 that is designed as a photonic crystal fiber 13. The light 7 is spectrally spread in the photonic crystal fiber 13 and coupled out of the fiber. The spectrally spread light 16 is subsequently coupled with the aid of a lens arrangement 14 into a further microstructured optical element 15, which is equipped as further photonic crystal fiber 17. The coupling of two optical fibers to a lens arrangement is standard in fiber optics and can be ready made. Located following the further photonic crystal fiber 17 is a third microstructured element 19 comprising a third photonic crystal fiber 23. In the transition region 20, which is illustrated with a gradual gray transition, the structural elements merge into one another continuously. After traversing all the optical elements, the light beam has a spectrum in which a particularly large quantity of light has been converted into specific spectral regions by comparison with all the other spectral regions. This spectrally shaped light beam 28 subsequently traverses a means 31 for selecting light components of at least one wavelength and/or at least one wavelength region, which is designed as an AOTF 33. Subsequently, the spectrally shaped light beam 28 is split with the aid of a beam splitter 36 into an excitation light beam 30 and a stimulation light beam 32. The stimulation light beam 32 traverses a phase delay plate 34 such as is used in STED microscopy. This mode of procedure is adequately known to the person skilled in the art. The two light beams are reunited with one another via a beam recombiner 38. As described in FIG. 3, this light beam can subsequently be coupled as illuminating light beam 29 into an inventive scanning microscope and used for the purpose of STED microscopy.

Figure 3:
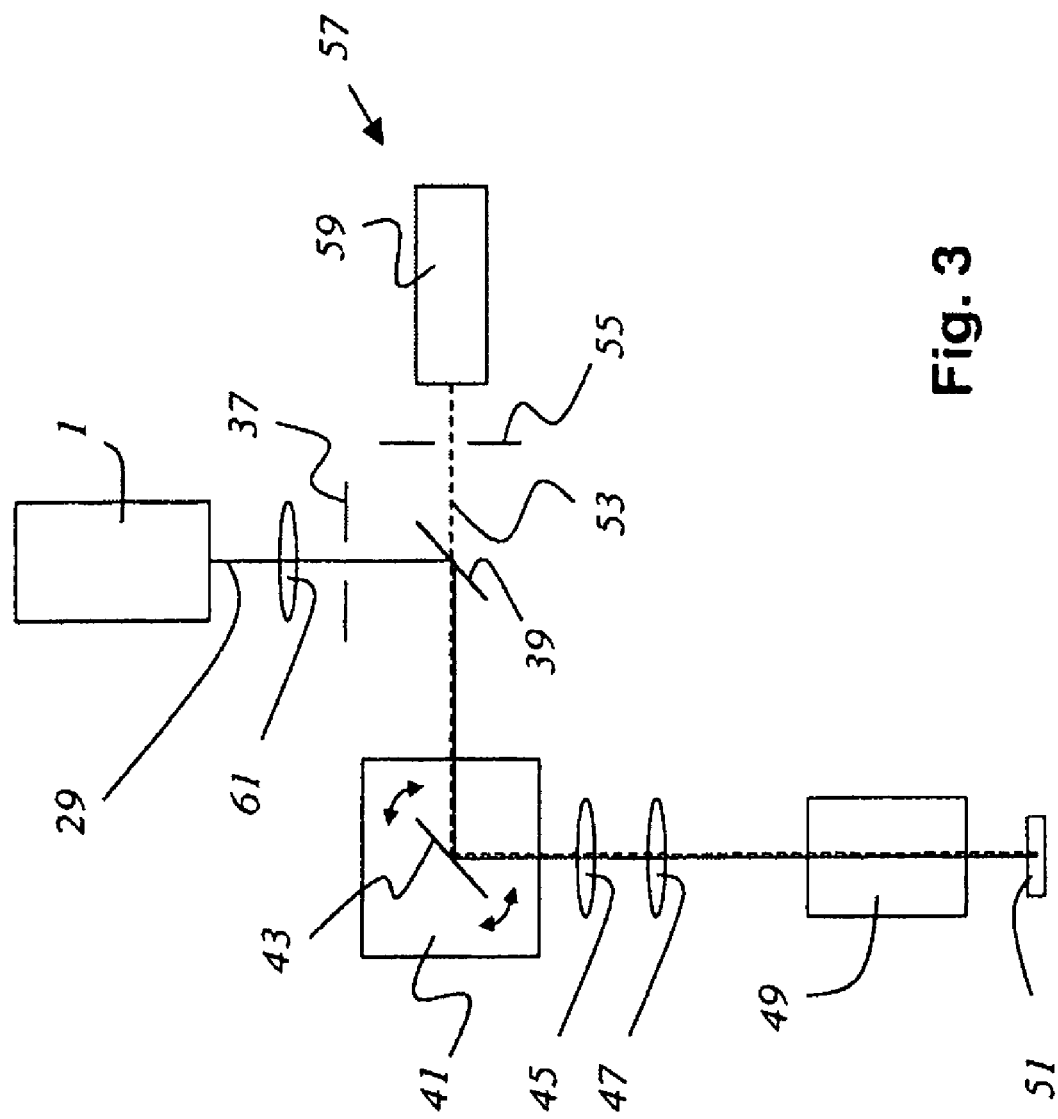
FIG. 3 shows an inventive confocal scanning microscope.

FIG. 3 shows an inventive scanning microscope that is designed as a confocal scanning microscope. The illuminating light beam 29 emanating from an inventive light source 1 having the microstructured optical elements (not shown in this figure) is focused by the lens 61 onto the illuminating pinhole diaphragm 37 and passes subsequently to the main beam splitter 39, which directs the illuminating light beam 29 to the beam deflecting device 41, which includes a cardanically suspended scanning mirror 43. The beam deflecting device 41 guides the illuminating light beam 29 through the scanning lens 45 and the tube lens 47 as well as through the objective 49 via or through the sample 51. Detection light 53 emanating from the sample and which is illustrated by dashes in the figure passes back, on the reversed light path, specifically through the objective 49, the tube lens 47 and through the scanning lens 45, to the beam deflecting device 41 and to the main beam splitter 39, passes the latter and, after traversing the detection pinhole diaphragm 55, passes to the detector 57 that is designed as a multiband detector 59. The detection light is detected in various spectral detection channels in the multiband detector 59, and generates electrical signals proportional to the power that are relayed to a processing system (not shown) for displaying an image of the sample 51.

The invention has been described with reference to a particular embodiment. However, it goes without saying that changes and modifications can be carried out without departing in so doing from the scope of protection of the following claims.

LIST OF REFERENCE NUMERALS 1 light source
3 primary light source
5 titanium sapphire laser
7 light
9 incoupling optics
11 microstructured optical element
12 conventional optical fiber
13 photonic crystal fiber
14 lens arrangement
15 further microstructured optical element
16 spectrally spread light
17 further photonic crystal fiber
19 third microstructured optical element
20 transition region
21 fourth microstructured optical element
23 third photonic crystal fiber
25 fourth photonic crystal fiber
27 optics
28 spectrally shaped light beam
29 illuminating light beam
30 excitation light beam
31 mean for selecting light components
32 stimulation light beam
33 AOTF
34 phase delay plate
35 housing
36 beam splitter
37 illuminating pinhole diaphragm
38 beam recombiner
39 main beam splitter
41 beam deflecting device
43 scanning mirror
45 scanning lens
47 tube lens
49 objective
51 sample
53 detection light
55 detection pinhole diaphragm
57 detector
59 multiband detector
61 lens

The invention claimed is:

1. A method for generating illuminating light, comprising:
generating spectrally spread light with the aid of a light source, the light source comprising: a first microstructured optical element that receives and spectrally spreads the light from a primary light source; and at least one further microstructured optical element that receives the spectrally spread light from the first microstructured optical element and further spreads the spectrally spread light
selecting at least one illuminating light wavelength and/or at least one illuminating light wavelength region from the further spectrally spread light, and
splitting off the illuminating light of the at least one illuminating light wavelength and/or of the at least one illuminating light wavelength region from the further spectrally spread light.

2. The method of claim 1, wherein the first microstructured optical element and/or the at least one further microstructured optical element contains photonic band gap material.

3. The method of claim 1, wherein the first microstructured optical element and/or the at least one further microstructured optical element are/is designed as optical fiber(s).

4. The method of claim 3, wherein the first microstructured optical element and/or the at least one further microstructured optical element have/has a taper.

5. The method of claim 3, wherein the first microstructured optical element and/or the at least one further microstructured optical element merge into one another continuously.

6. The method of claim 1, wherein the first microstructured optical element and/or the at least one further microstructured optical element are/is a photonic crystal fiber.

7. The method of claim 1, wherein the first microstructured optical element and/or the at least one further microstructured optical element are spliced together.

8. The method of claim 1, wherein the light that emerges from the first microstructured optical element is coupled into the at least one further microstructured optical element with the aid of a lens arrangement.

9. The method of claim 1, wherein the primary light source comprises a pulsed laser.

10. The method of claim 1, wherein the light from the primary light source repeatedly traverses the first microstructured optical element and/or the at least one further microstructured optical element.

11. The method of claim 1, further comprising providing means for selecting light components over at least one wavelength and/or at least one wavelength region.

12. The method of claim 1, wherein the light source is a component of a flow cytometer or an endoscope or a chromatograph or a lithography apparatus.

13. The method of claim 1, wherein the light source is a component of a microscope.

14. The method of claim 1, wherein the light source is a component of a scanning microscope.

15. The method of claim 14, wherein the scanning microscope is a confocal scanning microscope and/or a double confocal scanning microscope and/or an STED scanning microscope and/or an STED-4Pi scanning microscope and/or a CARS scanning microscope.

16. The method as claimed in claim 1, further comprising:
optically exciting a sample with the illuminating light.

17. The method as claimed in claim 1, further comprising:
selecting at least one further illuminating light wavelength and/or at least one further illuminating light wavelength region from the further spectrally spread light; and
splitting off further illuminating light of the at least one further illuminating light wavelength and/or of the at least one further illuminating light wavelength region from the further spectrally spread light.

18. The method as claimed in claim 17, wherein the further illuminating light effects a stimulated emission.

19. The method as claimed in claim 1, further comprising:
optically exciting a sample with the illuminating light;
selecting at least one further illuminating light wavelength and/or at least one further illuminating light wavelength region from the further spectrally spread light; and
splitting off further illuminating light of the at least one further illuminating light wavelength and/or of the at least one further illuminating light wavelength region from the further spectrally spread light, wherein the further illuminating light effects a stimulated emission.

20. The method as claimed in claim 1, further comprising:
optically pumping a sample with the illuminating light;
selecting at least one further illuminating light wavelength and/or at least one further illuminating light wavelength region from the further spectrally spread light; and
splitting off further illuminating light of the at least one further illuminating light wavelength and/or of the at least one further illuminating light wavelength region from the further spectrally spread light; and
optically probing the optically pumped sample with the further illuminating light.

* * * * *